H. M. JACOBS.
STEERING GEAR.
APPLICATION FILED OCT. 4, 1910.
991,067.
Patented May 2, 1911.
2 SHEETS—SHEET 2.
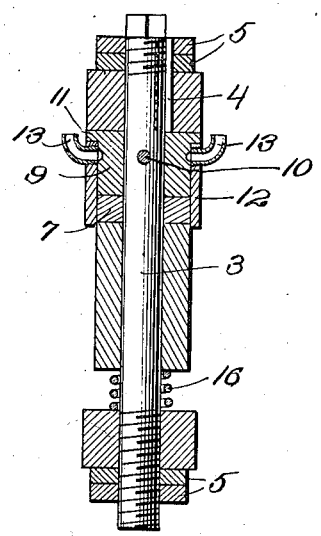
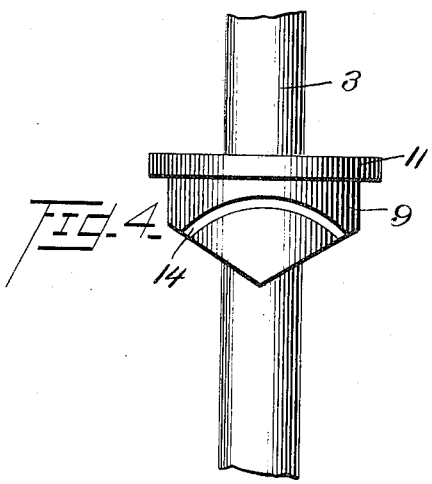
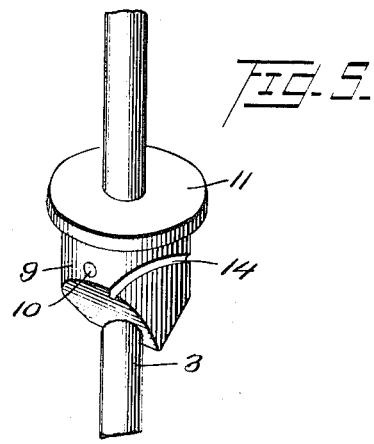
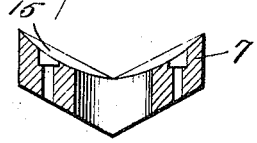
Witnesses
H. Strauss
R. H. Krenkel
Inventor
Heber M. Jacobs
By Joshua R. H. Potts
Attorney

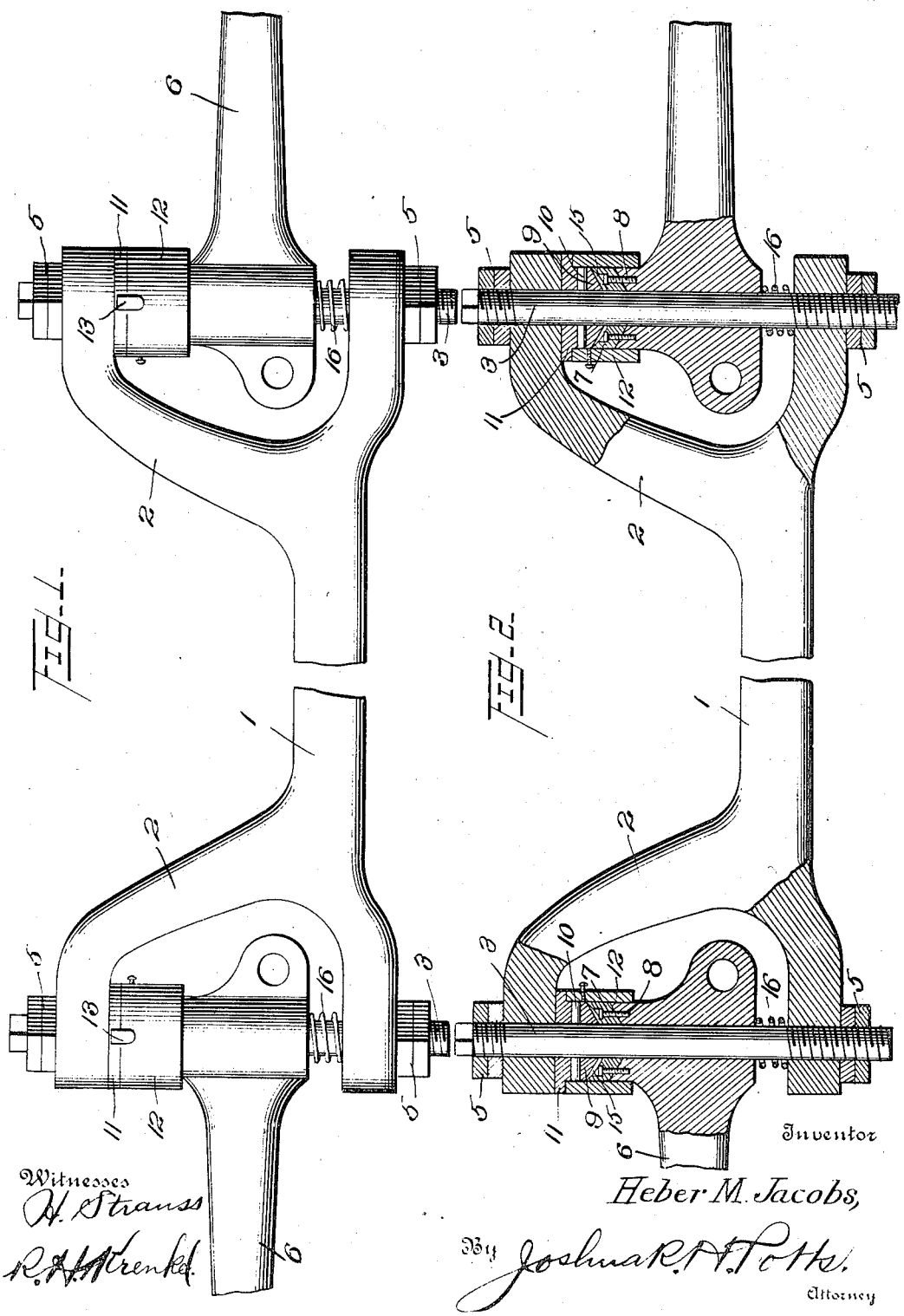

UNITED STATES PATENT OFFICE.

HEBER M. JACOBS, OF READING, PENNSYLVANIA, ASSIGNOR OF ONE-HALF TO CHARLES R. HENERY, OF HARRISBURG, PENNSYLVANIA.

STEERING-GEAR.

991,067.

Specification of Letters Patent. Patented May 2, 1911.

Application filed October 4, 1910. Serial No. 585,194.

*To all whom it may concern:*

Be it known that I, HEBER M. JACOBS, a citizen of the United States, residing at Reading, in the county of Berks and State of Pennsylvania, have invented certain new and useful Improvements in Steering-Gear, of which the following is a specification.

My invention relates to improvements in steering gear, which may of course be used in connection with any sort of vehicle, but is especially adapted for use in connection with steering gear of motor vehicles, the object of the invention being to provide improved mounting for the stubs supporting the steering wheels, which will normally hold the stubs in alinement with the axle, and in the event of a breakage in the steering mechanism, will return the stubs to such position and hold them in such position, compelling the vehicle to run straight and not veer to the side of the road.

A further object is to provide improvements of this character which will add but slight resistance to the ordinary steering of the vehicle, which permit of ready lubrication, which in the event of wear merely necessitates the removal of a wearing ring and the substitution of another.

With these and other objects in view, the invention consists in certain novel features of construction and combinations and arrangements of parts, as will be more fully hereinafter described and pointed out in the claim.

In the accompanying drawings: Figure 1, is a broken view in front elevation illustrating my improvements. Fig. 2, is a similar view partly in elevation and partly in section. Fig. 3, is a view in vertical cross section through the journal 3 taken at right angles to Fig. 2. Fig. 4, is a view of the double cam collar 9. Fig. 5, is a perspective view of the same on a reduced scale, and Fig. 6, is a view in cross section through the wearing ring.

1, represents the front axle of an ordinary motor vehicle having forked or bifurcated ends 2, 2, in which the vertical journal pins 3 are secured against turning by means of keys 4, and are held against longitudinal movement by means of nuts 5, screwed onto the ends of the journal pins.

6, 6, represent the axle stubs on which the steering wheels (not shown) are mounted. The enlarged inner end of these stubs have rotary mounting on journal pins 3 and are, as is common in general use, operated simultaneously by the steering mechanism of the vehicle. The upper ends of these bearing portions of the stubs are made wedge shape, in other words, they are beveled inward from both edges to the center, and wearing rings 7 of general V-shape in cross section are securely held on the bearing portions of the stubs by means of pins 8, which are positioned in registering openings in the rings and stubs.

Above the rings 7, my improved double cam collars 9, as I term them, are secured by pins 10 which pass through the collars and journal pins. The upper ends of these collars are provided with annular flanges 11 as illustrated, and the lower ends are wedged or V-shaped so as to fit the ring 7, and casings 12 are supported around the juncture of the wearing ring and the double cam collar, and are provided with inlets 13 for lubricant. These inlets communicate with grooves 14 in the double cam collar, and the latter communicate with recesses or pockets 15 formed in the upper faces of the wearing rings, so that the contact of the wearing rings and the double cam collars may be maintained thoroughly lubricated.

Coiled springs 16 are positioned around the journal pins between the axle stubs and the lower members of the bifurcated ends of the steering axle, exerting a constant upward pressure on the stubs.

When the stubs are turned so as to steer the vehicle, the ring 7 turns with the axle stub, and the double cam collar compels the axle to elevate slightly regardless of the direction of pivotal movement of the stubs. When in such position, if the steering mechanism should break the weight of the vehicle on the front axle would, by reason of the cam action of collar 10, compel the stubs to return to a position in alinement with the axle and cause the wheels to be held straight and run straight long enough to enable the machine to be brought to a stop.

It is to be understood that the double cam collar and the wearing ring are to be made of hardened steel, which will sustain the great wear to which they are necessarily subjected in use, and they may be readily replaced when worn.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with a steering axle having bifurcated ends, of journal pins secured in said bifurcated ends, axle stubs, bearings on said axle stubs mounted to turn on said journal pins, the upper ends of said bearings made V-shaped in cross section, wearing rings V-shaped in cross section supported on the upper ends of said bearings, said wearing rings and said bearings having registering openings, pins in said openings compelling the rings to turn with the bearings, double cam collars fixed to the pins above the wearing rings, springs around said journal pins pressing upward against said bearings, said wearing rings having recesses or pockets in their upper faces, said double cam collars having grooves in their opposite faces communicating with the point of juncture between said collars and rings, and casings around said points of contact, and having lubricant directing ducts registering with the grooves in the collars, substantially as described.

In testimony whereof I have signed my name to this specification in the presence of two subscribing witnesses.

HEBER M. JACOBS.

Witnesses:
DANIEL F. KUNKELMAN,
JOHN C. HIESTER.